Feb. 7, 1939.　　　　　E. PEREZ　　　　2,146,267
MACHINE FOR PEELING FRUIT
Original Filed Feb. 4, 1936　　3 Sheets—Sheet 1
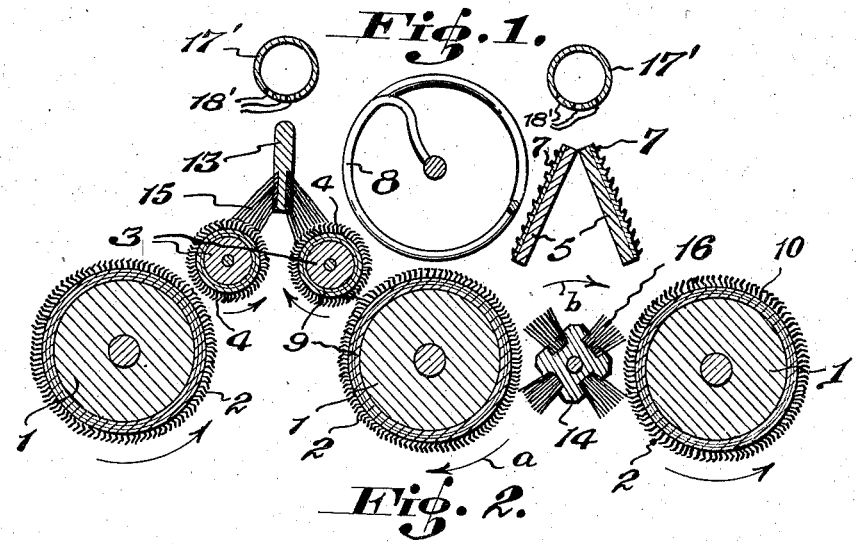
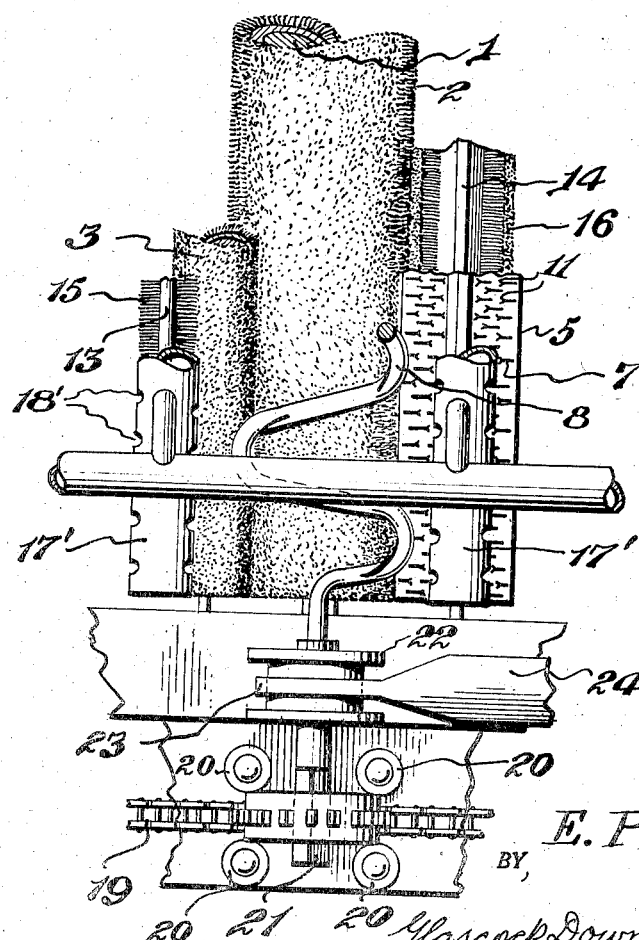
INVENTOR.
E. Perez Feb. 7, 1939.　　　　E. PEREZ　　　　2,146,267
MACHINE FOR PEELING FRUIT
Original Filed Feb. 4, 1936　　3 Sheets-Sheet 2
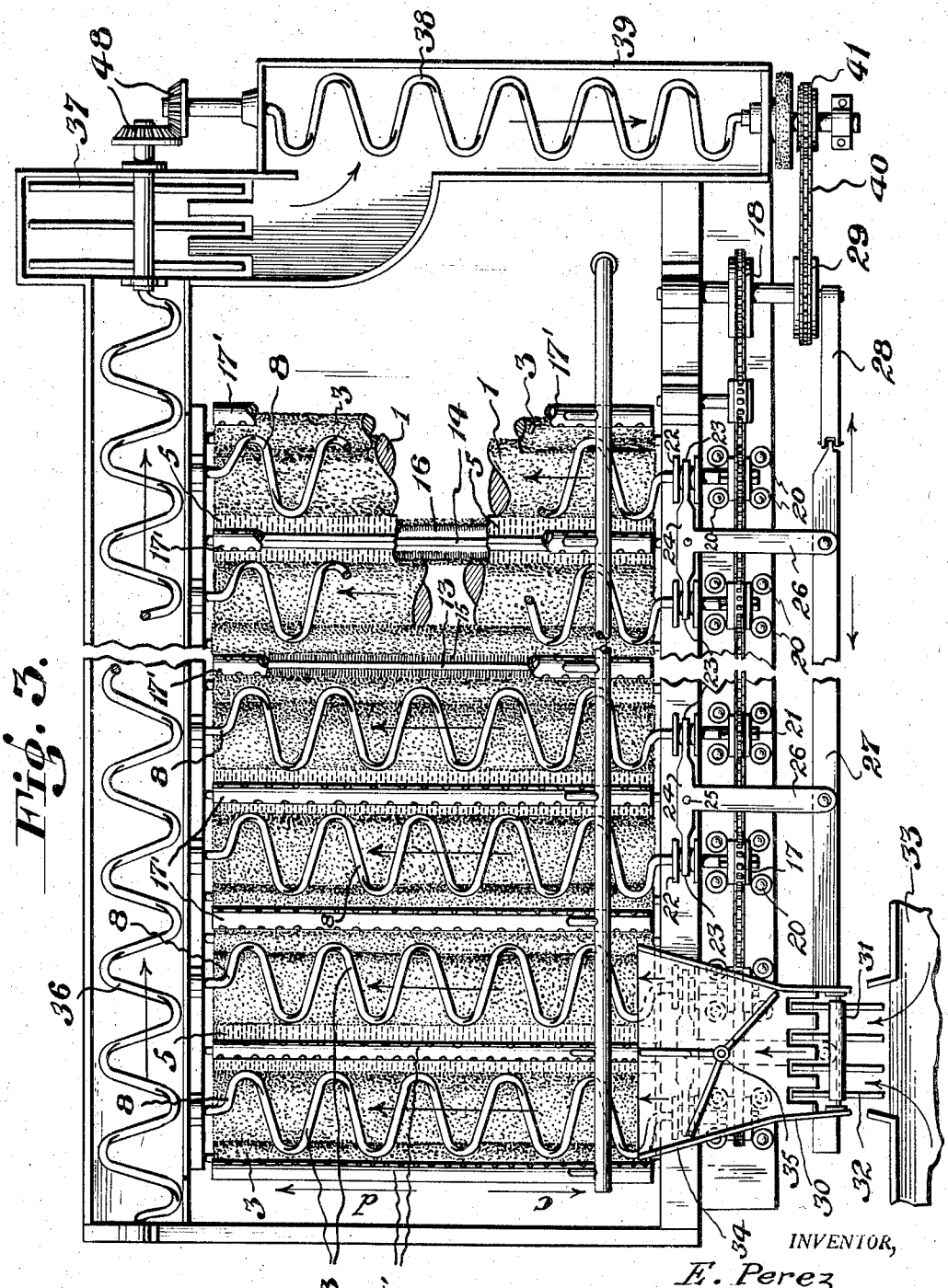
INVENTOR,
E. Perez
BY Glascock Downing & Seebold
ATTORNEYS.

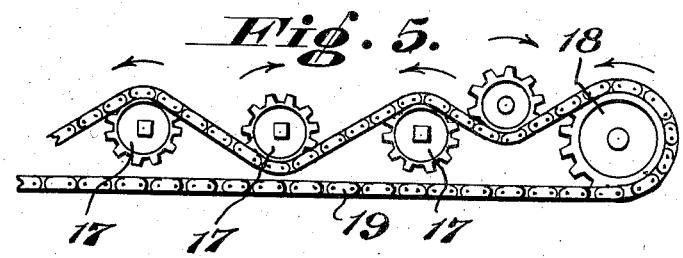
Fig. 5.
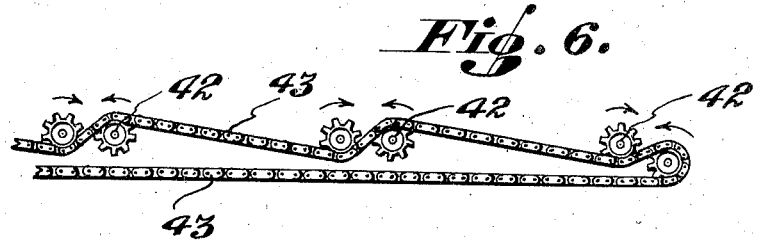
Fig. 6.
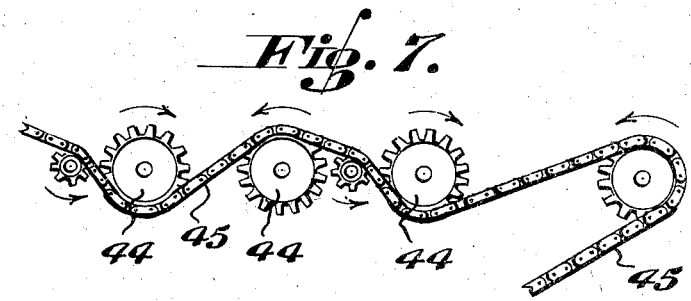
Fig. 7.
Fig. 4.
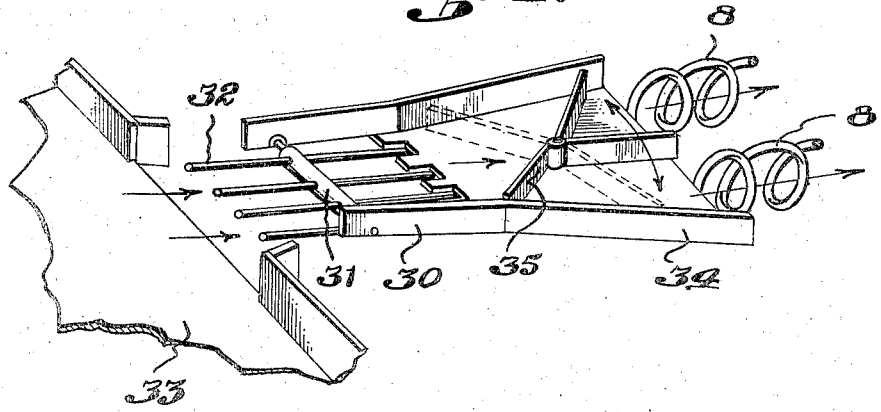

Patented Feb. 7, 1939

2,146,267

UNITED STATES PATENT OFFICE 2,146,267

MACHINE FOR PEELING FRUIT

Emilio Perez, Buenos Aires, Argentina

Application February 4, 1936, Serial No. 62,361.
Renewed December 17, 1938. In Argentina
December 2, 1935

3 Claims. (Cl. 146—49)

This invention relates to improvements in machines intended for peeling fruit and particularly for peeling fruit of the kind having an approximately globose shape.

One of the outstanding features of the invention resides in that the means which performs the stripping of the peel comprises surfaces covered with upstanding prickles, or points with which the fruit keeps in touch, these surfaces being distinguished by the fact that some of them are stationary and the others rotatory ones.

A further feature, being a supplement to that first referred to, consists in providing the surfaces in such a way that, as a whole, they will build up a bed along which the fruit must travel.

Another feature and which forms a part of those mentioned above consists in that the bed along which the fruit travels in order that it may be peeled comprises a lower rotatory surface, a lateral surface and another rotatory surface and another lateral surface which is stationary.

Another feature added to the foregoing ones is based on the fact that the course taken by the fruit along the channel provided by the prong-clad rotatory and fixed surfaces obeys to or is a consequence of the push imposed on it by a screw-shaped element arranged in the bed.

Still another feature which forms part of the preceding ones and makes for plenitude of the same consists in imparting to the screw-shaped element, which occupies the space of the bed along which the fruit is bound to travel during the process of losing its peel, a rotatory motion and at the same time a reciprocating one, in such a manner that the fruit is first impelled forwardly and then impelled partially rearwardly.

Added to these characteristics which, as a whole, determine the fundamental condition underlying this invention are others of minor or secondary import which accessorily contribute to the efficient performance of those mentioned to which reference will be made as occasion arises since the preceding lay-out has been proposed with a view to point out the main part of the machine which will be accompanied by other features of less importance.

In the accompanying drawings the machine illustrated therein while obeying to the constitution of basic elements is intended only for showing one of the various forms in which it may be put into practice.

Figure 1 illustrates in a vertical section one set of the fundamental elements,

Figure 2 is a plan view of the foregoing figure, the elements having been severed with a view to exhibit them without mutual interference, Figure 3 is a top plan view of an extensive and repeated arrangement of an industrial nature, Figure 4 is a perspective view showing one of the inlet pieces, Figure 5 is a representation of the transmission system of the screw elements, Figure 6 illustrates the transmission means for the lateral cylinders of the bed, Figure 7 shows the driving means for the lateral cylinders forming the channel bottom.

The machine under consideration has for its main elements the cylinders 1 which are covered with prickles 2 and lie in the lower portion of the virtual channel along which the fruit to be peeled moves. The intermediate cylinder 1 of Fig. 1 rotates in the direction indicated by the arrow $a$, and the cylinder 3 which is provided with prickles 4 closes the channel at one side and rotates in a similar sense to cylinder 1, and finally the side opposite the cylinder 3 is constituted by wall 5 which is also provided with small hooks 7.

Within the virtual channel formed by the elements 1, 3 and 5 a worm element 8 rotates, which is constituted preferably by a vaned rod forming a cylindrical propeller whose pitch matches the usual dimension of the fruit.

The prickle-clad cylinders 1 and 3 consist of a card wire clothing 9 the wires of which pass through the clothing and project outwardly with an obtuse angular bend 10 directed towards the direction of rotation of the cylinders. The wire clothing is secured to the cylinders by the integration brought about through a resin bath.

The wall 5 is constituted over its whole inner surface by saw-teeth hooks 7 arranged in parallel and juxtaposed in an inclined plane, with the teeth upstanding as illustrated in Figure 1 and split into two points 11 opened up in an exactly opposed sense as shown in Fig. 2.

Complementary to the above referred to elements of importance are the brush-carriers 13 and 14, 13 being stationary and 14 being rotatory, its sense of gyration being indicated by the arrow $b$. Brush-carrier 13 acts on the cylinders 3 since its bristles or wires 15 are in touch permanently with two of these cylinders. The rotatory brush-carrier 14 has its bristles divided into longitudinal radial rows 16 which also impinge on a pair of cylinders 1, as shown in Fig. 1.

At the upper edges of the two channels provision is made for the water pipes 17' provided with lower orifices 18' which during the whole operation of peeling pour a rain on the fruit, this rain spreading over the cylinders so as to facilitate their cleaning in co-operation with the brushes and contributing not only to the softening of the surface of the fruit but also to the destroying action of the barbed wire surfaces.

The fruit intended to be peeled enters by one of the ends of the channel just described, subject, of course, to the direction of rotation both of worm-piece 8 and cylinders 1 and 3, while the piece 8, due to its rotation and reciprocating motion, causes the surface of the peel to get into total and repeated touch with the prickles both of these cylinders and the wall 5 whereby the peel is being perforated at countless points and shifted about at the same time.

In Figure 3 the elements are shown as a machine structure, the general path of each fruit unit being illustrated from the outset of the operation. It should be understood, of course, that underneath each spiral there is located the system of Figs. 1 and 2.

The elements 8 are arranged in a battery of more or less extension, each of them being operated by a gear or wheel 17 which, as is shown in Fig. 5, receive the driving effect from the wheel 18 and as a consequence of the motion of chain 19.

The pins 20 serve as a support for the wheels 17 into the shaft of which the square piece 21 slides, the same being capable of readily sliding into the wheel. The wheels impart rotatory motion to each of the spirals 8, and at the initial point of the first curve of the worm of each of these elements a pulley 22 is mounted which receives the two small forks 23 arranged at the ends of the balancing piece 24. Each balancing piece is pivotably mounted at 25 and through its extension 26 connects with the bar 27 which performs a reciprocating motion by the action of the rod 28 and receives from the crank arm carried by the wheel 29 such action, which results in the spirals being furnished, in addition to the rotating motion imparted to them by the wheels 17, with a translation motion in the direction of the arrows c and d.

The fruit enters by way of the inlet mouth 30 as shown in Figs. 3 and 4 which has one of them arranged at the central point intermediate of the wheels 17 at a higher level, the number of such inlet mouths being equal to half the number of peeling channels.

The inlet mouth 30 is provided with a lifting winch 31 having blades 32 which picks the fruit from the path 33 and lifts it up to the funnel 34 where it meets a three-legged gate 35. The gate is provided with arms which serve to distribute the fruit into the channels in a manner which is in accordance with their peeling performance.

When the fruit has moved through the channels which lie under each spiral it arrives at the cross spiral 36 which conveys the same to an ultimate hoisting winch 37 where it is lifted up to the finishing cylinders which are similar to the cylinders 1 and 3 and where the spiral 38 within the channel 39 gives it the finishing touches.

The wheel 41 which is located at the end of spiral 38 is adapted to be driven by the chain 40 to thus drive the spiral 38 and the conveyor 36 through the bevel gears 48.

The transmission systems shown in Figs. 6 and 7 are those which impart rotating motion to the cylinders 3 and to the brush-carriers 14.

The gears 42 are attached to the shafts of the cylinders 3 and have a chain 43 which links them up while owing to its special path it imparts to them the necessary rotation.

A similar thing happens to the wheels 44 as far as the chain 45 is concerned, since the rotating brushes 14 so require it.

All the accessory elements mentioned in the last paragraphs may be modified, provided the essential elements set forth in the appended claims are allowed to subsist.

What I claim is:

1. In a fruit peeling machine the combination of, a plurality of paring elements consisting of prickle-clad cylinders arranged in a horizontal manner adjacent each other to provide channels therebetween, means for rotating said cylinders, with a stationary laterally positioned wall provided with a prickle-clad surface, said wall being arranged along and above at least one of said cylinders so as to provide a channel therebetween, means for positively moving the fruit along said rotating cylinders and said wall whereby the fruit moves into said channels engaging the prickles of said cylinders and said wall to thus remove the peeling therefrom.

2. A fruit peeling machine comprising in combination, a plurality of paring elements consisting of prickle-clad cylinders arranged in a horizontal manner adjacent each other to provide channels therebetween, another peeling element mounted for rotation and having circumferentially spaced groups of prickles extending radially therefrom, means for rotating said peeling elements, means for positively moving the fruit along said peeling elements whereby the fruit moves into said channels and the spaces between said circumferentially spaced groups of prickles whereby the peeling is removed therefrom.

3. A fruit peeling machine comprising in combination, a plurality of peeling elements consisting of prickle-clad cylinders arranged in a horizontal manner adjacent each other to provide channels therebetween, a stationary prickle carrying surface arranged above said cylinders and having the prickles thereof engaging the prickles of at least two of said cylinders, means for rotating the cylinders, and means for positively moving the fruit along said rotating cylinders whereby the fruit moves into said channels and engages the prickles of said cylinders, and prickles carried by said stationary surface whereby the peeling is removed therefrom.

EMILIO PEREZ.